United States Patent Office 3,679,634
Patented July 25, 1972

3,679,634
POLYMERS OF FLUORINATED ETHYLENE IMINES AND THEIR USE FOR TEXTILE FINISH
Erich Schuierer and Werner Renz, Burghausen, and Hans Sommer, Hofheim, Taunus, Germany, assignors to Farbwerke Hoechst Aktiengesellschaft vormals Meister Lucius & Brüning, Frankfurt am Main, Germany
No Drawing. Filed July 27, 1970, Ser. No. 58,648
Claims priority, application Germany, Aug. 8, 1969, P 19 40 351.1
Int. Cl. C08g 22/02
U.S. Cl. 260—77.5 B                 4 Claims

ABSTRACT OF THE DISCLOSURE

Fluorinated polymers and copolymers are obtained by reacting toluene diisocyanate with fluorinated alkanols, optionally in admixture with fluorine-free alkanols, and ethylene imine and polymerizing the so-obtained ethylene imine ureas in the presence of boron trifluoride. The polymers and copolymers are water- and oil-repellent agents for fibrous materials, especially textiles.

The present invention relates to new fluorinated polymers and mixed polymers. A further object of this invention are processes for the preparation of said high-molecular substances. Still a further object of the invention is a process for rendering textile materials water- and oil-repellent by contacting said fibrous materials with the fluorine-containing resins. Further objects of the instant invention will appear to anyone skilled in the art from the following disclosure.

The present invention provides fluorinated polymers having recurrent units of the general formula

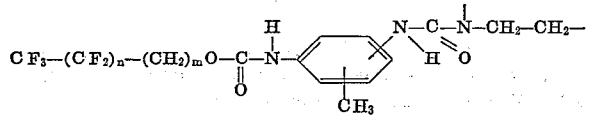

obtained by polymerization of ethylene imine derivatives of the general formula

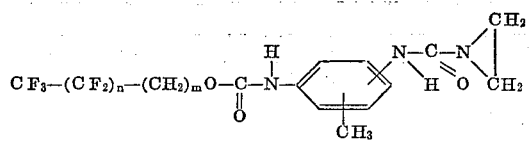

in which $n$ stands for an integer of 3 to 9, preferably 5 to 9, and $m$ for 1 or 2. These polymers have a melting point of from 90 to 105° C.

Fluorine-containing ethylene imine derivatives on the basis of fluorinated carboxylic acids and polymers thereof are known from U.S. Patent No. 3,198,754 and published Dutch patent application No. 64 12323. The monomers are generally obtained from fluorinated carboxylic acid halides or carboxylic acid esters and ethylene imine according to the following equation:

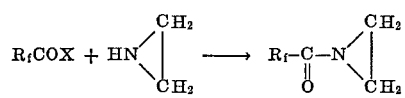

in which X stands for halogen or alkoxy.

The aziridines obtained by this reaction can be polymerized under heat or by means of Lewis acids or Lewis bases in the following manner:

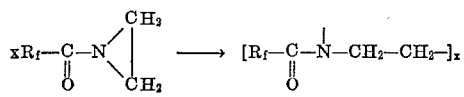

The use of the monomers and polymers for the textile finish is limited to aqueous emulsions or solutions of the substances in alcohol, acetone, aromatic hydrocarbons and esters of fluorinated carboxylic acids. A disadvantage is their low solubility in commercial lower fluorinated hydrocarbons and fluorinated chlorohydrocarbons, which prevents their use as a spray.

German Auslegeschrift No. 1,272,298 discloses N-fluoroalkyl-N′-ethylene ureas of the general formula

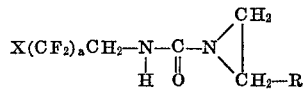

in which $a$ stands for an integer of at least 3, X for fluorine or hydrogen and R for hydrogen or lower to medium alkyl. These compounds are applied to textile material from aqueous solutions of organic acids or from solutions in alcohols, ethers and ketones, and polymerized thereon by subsequent heating. These ethylene imine derivatives can neither be used as a spray since they are sparingly soluble in lower fluorinated hydrocarbons and fluorinated chlorohydrocarbons.

It has now been found that ethylene imine derivatives of the general formula

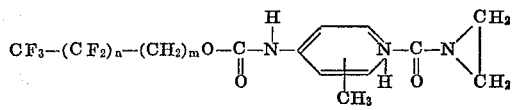

and polymers thereof having recurrent units of the formula

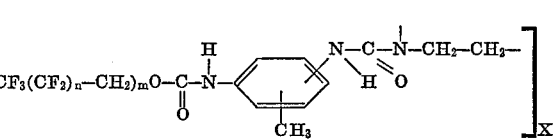

in which $n$ and $m$ are defined as above, can very easily be dissolved in commercial fluorinated hydrocarbons and thus are excellently suitable in the form of a spray for rendering textile material oil- and water-repellent.

The ethylene imine derivatives serving as starting material are derived from fluorine-containing alcohols which can be prepared by a reaction with a toluylene diisocyanate and then with ethylene imine according to the following scheme:

(1)

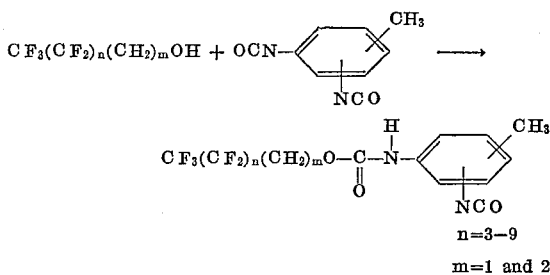

$n = 3-9$
$m = 1$ and $2$

The reaction is carried out in substance or in solution in a molar ratio of 1:1 at about 70 to about 100° C.

(2) The reaction mixture obtained sub (1) is reacted at about 0 to about 20° C., with 1 mol of ethylene imine:

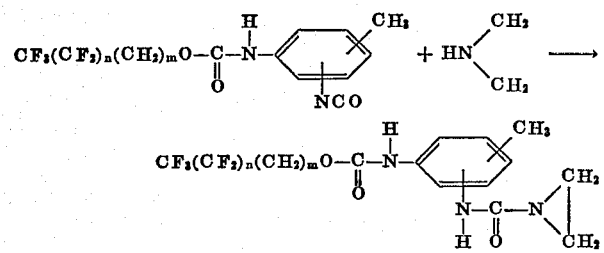

(3) At about 50 to about 120° C., preferably at about 70° C., polymerization is then effected in substance or—because of a better dissipation of heat—in fluorinated hydrocarbons in the presence of 0.1 to 1% by weight of BF$_3$-dioxan, whereupon the polymers of the invention are obtained as colorless solid substances having a melting point of from about 90° to 105° C.:

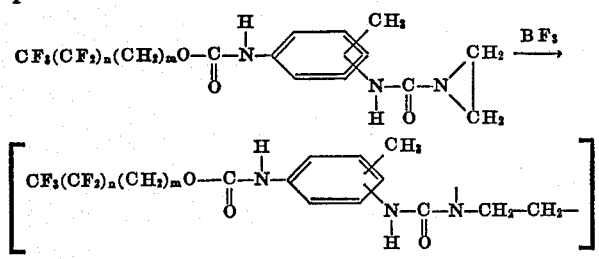

The fluorine content of the polymers of the invention can be reduced by copolymerizing the fluorine-containing monomeric ethylene imine compounds of the formula

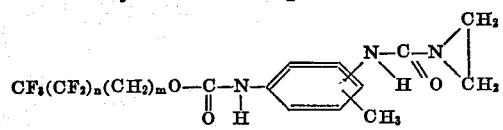

in which $n$ is from 3 to 9 and $m$ is 1 or 2, with fluorine-free ethylene imine derivatives of the formula

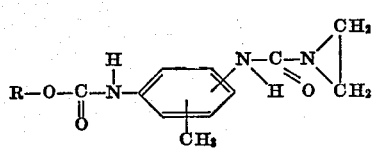

in which R stands for alkyl having 4 to 20, preferably 12 to 20, especially 16 to 20, carbon atoms, in a molar ratio of from about 1:1 to about 10:1, preferably from about 4:1 to about 8:1.

The products that can be prepared according to the present invention impart to textile material, for example cotton and wool, excellent oil- and water-repellent properties resistant to washing. They are superior to hitherto known products with regard to their good solubility in lower fluorinated hydrocarbons and fluorinated chlorohydrocarbons. The polymers can be dispersed in an aqueous solution of acetic acid; they are moreover readily soluble in ketones, for example acetone or methylethylketone, and in mixtures of a lower alkanol, e.g. isopropanol and fluorinated chlorohydrocarbons. Owing to their good solubility in mixtures of fluorinated chlorohydrocarbons and alcohols, the products can be used in the form of sprays.

The following examples serve to illustrate the invention.

EXAMPLE 1

Under an inert gas, 0.12 mol of a freshly distilled commercial toluene diisocyanate was added to 0.12 mol of 1,1-dihydroperfluoro-n-octyl alcohol in small portions at 60° C. The mixture was then stirred for 1 hour at 70° C., the product was allowed to cool to 40° C. and 0.12 mol of ethylene imine was added dropwise while stirring. To start polymerization 0.1 g. of an adduct of BF$_3$ and dioxan was then added (temperature: 60–100° C., polymerization time: 1 hour). The polymer was a colorless product that was solid at room temperature and had a melting point of 92° C.

EXAMPLE 2

0.12 mol of 1,1-dihydroperfluoro-n-octyl alcohol was reacted as disclosed in Example 1 with 0.12 mol of toluene diisocyanate and 0.12 mol of ethylene imine. However, for the polymerization the fluorine-containing monomeric ethylene imine derivative obtained was dissolved in 175 ml. of 1,1,2-trifluoro-1,2,2-trichloroethane and the solution was stirred for 7 hours at 70–80° C. in a glass autoclave with 0.1 g. of BF$_3$-dioxan. A polymer of the melting point of 90° C. was obtained.

EXAMPLE 3

1.2 mol of 2,4-toluene-diisocyanate was added at 40–60° C. to a solution of 1.2 mols of 1,1-dihydroperfluoro-n-octyl alcohol in 1,1,2-trifluoro-1,2,2-trichloro-ethane (300 ml.) placed in a flask of a capacity of 1 liter, provided with stirrer. The solution was refluxed for 1 hour, then allowed to cool to 20° C. and 1.2 mols of ethylene imine were then added dropwise to the solution while cooling with ice water. During this operation the temperature did not exceed 20° C. The contents of the flask were then transferred to a 1 liter-glass autoclave and stirred for 1 hour at 70° C. together with 1 g. of BF$_3$-dioxan. After evaporation of 1,1,2-trifluoro-1,2,2-trichloro-ethane the polymer was obtained as a colorless solid product having a melting point of 90° C.

EXAMPLE 4

0.16 mol of 1,1,2,2-tetrahydro-perfluoro-octanol-1 was reacted according to Example 3 with equivalent amounts of toluene diisocyanate and ethylene imine and the reaction product was polymerized with 0.1 g. of BF$_3$-dioxan at 70° C. for 7 hours. A polymer having a melting point of from 90 to 95° C. was obtained.

EXAMPLE 5

0.167 mol of 1,1,2,2-tetrahydro-perfluoro-decanol-1 was reacted according to Examples 3 and 4 with toluene diisocyanate and ethylene imine and the reaction product was polymerized with 0.15 g. of BF$_3$-dioxan for 4 hours at 70° C. A polymer having a melting point of 105° C. was obtained.

EXAMPLE 6

Copolymers on the basis of 1,1-dihydro-n-perfluorooctyl alcohol and n-stearyl alcohol:

(a) At 40–60° C., first 0.25 mol of toluene diisocyanate and then, at 0–20° C., 0.25 mol of ethylene imine were added to a solution of 0.25 mol of 1,1-dihydro-n-perfluoro-octyl alcohol in 200 ml. of 1,1,2-trifluoro-1,2,2-trichloro-ethane.

(b) 0.04 mol of n-stearyl alcohol dissolved in 1,1,2-trifluoro-1,2,2-trichloro-ethane was reacted at 50° C. with 0.04 mol of toluene diisocyanate; the mixture was then cooled to 0° C. and 0.04 mol of ethylene imine was added at 0–20° C.

The reaction products of (a) and (b) were combined and polymerized with 0.25 g. of BF$_3$-dioxan for 7 hours at 70° C. in a glass autoclave (diluent: 1,1,2-trifluoro-1,2,2-trichloro-ethane or acetone).

In order to demonstrate the excellent properties of the disclosed fluorinated chemical compounds, various types of textiles (for example cotton and wool) are finished with the active ingredients prepared according to Examples 1 to 6 by three different application methods:

(A) An endless fabric strip is passed through a 1%-solution of the active ingredients in acetone until the whole solvent has evaporated and the fluorinated product used deposits on the fabric quantitatively (pick-up: 1%, calculated on the weight of the fabric material).

To fix the active ingredient on the fiber the fabric is subjected to a thermal aftertreatment at 130° C. Table 1 shows the oil- and water-repellency values so-obtained with the novel products of the invention in comparison with two commercial products: FC 218® produced by Messrs. 3 M company and Scotchgard® Oleophobol P 68 produced by Messrs. Chemische Fabrik Pfersee, both being among the best products available in this field.

(B) Fabric samples are immersed in aqueous acetic-acid active ingredient dispersions and then squeezed off. For this purpose, a 30%-solution of the novel fluorine-containing products in glacial acetic acid and water (1:1) is prepared. By dilution with water a dispersion having an active ingredient content of 1% can be obtained from this solution. The thermal after-treatment is carried out at a temperature of 150° C. (Table 2).

(C) The fabric samples are sprayed with a solution of the active ingredients in 1,1,2-trifluoro-1,2,2-trichloro-ethane/alcohol mixtures and the finished fabrics are dried at room temperature (see Table 3). For this purpose, the products are dissolved in a mixture of 1,1,2-trifluoro-1,2,2-trichloro-ethane and methanol or isopropanol (8:2), subsequently the solutions are further diluted and sprayed onto one side of the fabrics.

The test for oil repellency of the fabrics finished according to methods A to C is carried out using mixtures of n-heptane-paraffin oil according to the following scale (U.S. Pat. No. 3,362,782):

| Oil repellency value | Percent by volume of— | |
|---|---|---|
| | n-Heptane | Paraffin (DAB 6 [1]— grade) |
| 50 | 0 | 100 |
| 60 | 10 | 90 |
| 70 | 20 | 80 |
| 80 | 30 | 70 |
| 90 | 40 | 60 |
| 100 | 50 | 50 |
| 110 | 60 | 40 |
| 120 | 70 | 30 |
| 130 | 80 | 20 |

[1] DAB = Deutsches Arzneibuch.

For testing the water-repellent effect, water drops are applied from a pipette and the effect is evaluated after an action period of 3 minutes.
+ means no wetting
+− means moderate wetting
− means immediate wetting The resistance to washing of the finish is tested with commercial detergents by washing the samples up to a maximum of 5 times at 40° C. for wool and at 100° C. for cotton.

In the following tables the products have been given the same numbers as the examples according to which they have been prepared.

TABLE 1
Oil- and water-repellency of fabrics finished according to method A; 1%-pick-up

| Product | Cotton | | | | Wool | | | |
|---|---|---|---|---|---|---|---|---|
| | Not washed | Washed | | | Not washed | Washed | | |
| | | 1× | 2× | 5× | | 1× | 2× | 5× |
| 1 | 110/+ | 110/+ | 110/+ | 110/+ | | | | |
| 2 | 120/+ | 110/+ | 110/+ | 110/+ | 110/+ | 100/+ | 100/+ | 90/+ |
| 3 | 120/+ | 110/+ | 100/+ | 100/+ | 100/+ | 100/+ | 100/+ | 90/+ |
| 4 | 100/+ | 100/+ | 100/+ | 100/+ | 100/+ | | | |
| 5 | 130/+ | 120/+ | 120/+ | 120/+ | 130/+ | | | |
| 6 | 110/+ | 100/+ | 90/+ | 80/+ | 120/+ | 90/+ | 80/+ | 80/+ |
| 7 (comparison) [1] | 130/+ | 100/+ | 90/+ | 70/− | 130/+ | 130/+ | 130/+ | 100/+ |
| 8 (comparison) [2] | 80/+ | 70/+ | 70/+− | 60/+− | 110/+ | 110/+ | 110/+ | 100/+ |

[1] Commercial product ® FC 218 by Messrs. 3 M Company.
[2] Commercial product ® Scotchgard Oleophobol P 68 by Messrs. Chemische Fabrik Pfersee.

TABLE 2
Oil- and water-repellency of cotton fabrics finished according to method B

| Products | Percent pick-up, calculated on fabric weight | Oil-/water repellency | | | |
|---|---|---|---|---|---|
| | | Not washed | Washed | | |
| | | | 1× | 2× | 5× |
| 2 | 1.3 | 100/+ | 80/+− | 80/+− | 70/− |
| 3 | 1.9 | 110/+ | 100/+ | 90/+ | 90/+− |
| 6 | ([1]) | 100/+ | 70/+ | 60/+ | 60/+− |

[1] Not determined.

TABLE 3
Oil- and water repellency of fabrics finished according to method C (pick-up, calculated on fabric weight: 1%)

| Products | Oil-/water repellency | | | | | |
|---|---|---|---|---|---|---|
| | Cotton | | | | Wool, not washed | Polyethyleneglycol terephthalate/cotton, not washed |
| | Not washed | Washed | | | | |
| | | 1× | 2× | 5× | | |
| 1 | 100/+ | 80/+− | 80/− | | 80/− | 90/+ | 120/+ |
| 2 | 100/+ | 90/+− | 90/+− | 80/− | 110/+ | 100/+ |
| 3 | 100/+ to 110/+ | 90/+ to 100/+ | 90/+− | 90/− | 100/+ to 110/+ | 100/+ to 110/+ |
| 4 | | | | | | |
| 5 | 120/+ | 120/+ | 120/+ | 90/+ | 120/+ | 120/+ |
| 6 | 120/+ | 90/+− | 80/+− | 80/− | 110/+ | 100/+ |

EXAMPLE 7

Copolymers on the basis of 1,1,2,2-tetrahydro-perfluoro-octanol, 1,1,2,2-tetrahydro-perfluoro-decanol and 1,1,2,2-tetrahydro-perfluoro-dodecanol.

As disclosed in Examples 1–3, the following bis-urethanes were prepared:

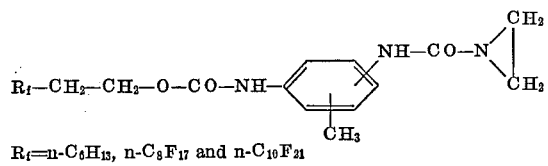

$R_f = n\text{-}C_6H_{13}$, $n\text{-}C_8F_{17}$ and $n\text{-}C_{10}F_{21}$

A mixture of 20 g. each of these bis-urethanes was polymerized in 180 g. of 1,1,2-trifluoro-1,2,2-trichloro-ethane with 0.1 g. of BF$_3$-dioxan for 7 hours at 70° C. in a glass autoclave. The polymer thus obtained was used to finish a blended fabric made of polyethylene-glycol terephthalate and cotton (50:50) in the following manner:

The fabric was immersed in a solution of the polymer in 1,1,2 - trifluoro - 1,2,2 - trichloro-ethane-isopropanol (4:1), dried in horizontal position at 110° C. for 10 minutes and then heated to 155° C. for 5 minutes. The pick-up corresponded to 0.2% of fluorine, calculated on the fabric weight.

Oil- and water-repellency values found:
Not washed _____ 120+
After having been washed:
    Once _____ 120+
    Twice _____ 120+
    Three times _____ 110+

Washing was effected at 60° C.

We claim:

1. A polymer consisting essentially of recurring units of the formula

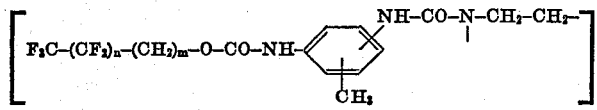

in which $n$ is an integer of 3 to 9 and $m$ is 1 or 2, and melting in the range of 90 to 105° C.

2. The polymer as claimed in claim 1, wherein $n$ is an integer of 5 to 9.

3. A copolymer consisting essentially of recurring units of the formulae

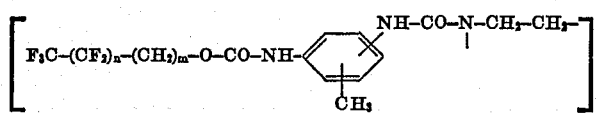

and

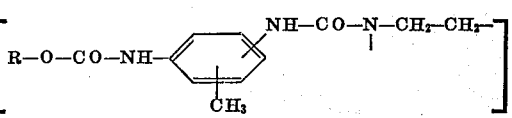

in which $n$ is an integer of 3 to 9, $m$ is 1 or 2 and R is alkyl of 4 to 20 carbon atoms, wherein the ratio of fluorine-containing units to fluorine-free units is in the range of 1:1 to 10:1.

4. The copolymer as claimed in claim 3, wherein R is alkyl of 12 to 20 carbon atoms.

References Cited

UNITED STATES PATENTS

| | | | |
|---|---|---|---|
| 3,198,754 | 8/1965 | Ahlbrecht et al. | 260—2 EN |
| 3,274,174 | 9/1966 | Enders et al. | 260—77.5 C |

FOREIGN PATENTS

| | | | |
|---|---|---|---|
| 1,272,298 | 7/1968 | Germany | 260—77.5 |

DONALD E. CZAJA, Primary Examiner

M. J. WELSH, Assistant Examiner

U.S. Cl. X.R.

117—135.5; 260—29.2 TN, 32.8 N, 33.4 UR, 77.5 CH